(12) United States Patent
Cross

(10) Patent No.: US 12,442,403 B2
(45) Date of Patent: Oct. 14, 2025

(54) SHAFT MOUNTING ASSEMBLY

(71) Applicant: CROSS MANUFACTURING COMPANY (1938) LIMITED, Bath (GB)

(72) Inventor: Edward Henry Cross, Bath (GB)

(73) Assignee: CROSS MANUFACTURING COMPANY (1938) LIMITED, Bath (GB)

( * ) Notice: Subject to any disclaimer, the term of this patent is extended or adjusted under 35 U.S.C. 154(b) by 585 days.

(21) Appl. No.: 17/798,939

(22) PCT Filed: Feb. 12, 2021

(86) PCT No.: PCT/GB2021/050352
§ 371 (c)(1),
(2) Date: Aug. 11, 2022

(87) PCT Pub. No.: WO2021/161041
PCT Pub. Date: Aug. 19, 2021

(65) Prior Publication Data
US 2023/0160470 A1    May 25, 2023

(30) Foreign Application Priority Data

Feb. 12, 2020  (GB) ...................................... 2001917
Nov. 6, 2020   (GB) ...................................... 2017552

(51) Int. Cl.
*F16B 21/18*   (2006.01)
*F16J 15/3268* (2016.01)

(52) U.S. Cl.
CPC ........... *F16B 21/18* (2013.01); *F16J 15/3268* (2013.01); *Y10S 403/07* (2013.01); *Y10S 403/14* (2013.01);

(Continued)

(58) Field of Classification Search
CPC ........ F16B 21/16; F16B 21/18; F16B 21/183; F16B 21/186; F16D 1/0835;
(Continued)

(56) References Cited

U.S. PATENT DOCUMENTS

| 1,483,903 A | 2/1924 | Masury |
| 3,228,705 A | 1/1966 | Underwood |
| 4,676,143 A | 6/1987 | Nomura et al. |

(Continued)

FOREIGN PATENT DOCUMENTS

| CN | 203431173 U | 2/2014 |
| DE | 831620 C | 2/1952 |

(Continued)

*Primary Examiner* — Josh Skroupa
(74) *Attorney, Agent, or Firm* — Dickinson Wright PLLC; Andrew D. Dorisio

(57) ABSTRACT

A shaft mounting assembly includes an elongate shaft with an outer surface having a substantially circular cross-section and a cylinder having an inner surface defining a bore housing the shaft. A spring having a substantially circular discontinuous band with correspondingly shaped axially arcuate inner and outer surfaces. One of the surfaces comprises a groove, and the spring is positioned in the groove with both axial edges of the band located therein. In a de-energised state of the spring, the height of the band is greater than the depth of the groove, a portion of the band between the axial edges protruding out of the groove, the axial width of the band being less than the width of the groove; and, an energised state with the spring compressed within the bore to reduce the height of the band and increase the axial width compared to the de-energised state.

23 Claims, 8 Drawing Sheets

(52) U.S. Cl.
CPC .. *Y10T 403/32983* (2015.01); *Y10T 403/7061* (2015.01)

(58) Field of Classification Search
CPC .... F16D 2300/22; F16J 15/0887; F16J 15/32; F16J 15/3228; F16J 15/3268; Y10S 403/07; Y10S 403/14; Y10T 403/32893; Y10T 403/455; Y10T 403/7047; Y10T 403/7061; Y10T 403/7075
USPC ................ 464/180; 403/165, 225, 365, 372, 403/DIG. 7, DIG. 14
See application file for complete search history.

(56) References Cited

U.S. PATENT DOCUMENTS

| | | | |
|---|---|---|---|
| 4,697,992 A | 10/1987 | Hatakeyama et al. | |
| 4,714,259 A * | 12/1987 | Mack | F16J 15/32 277/589 |
| 5,261,677 A * | 11/1993 | Gotoh | F16J 15/32 277/549 |
| 5,498,042 A * | 3/1996 | Dole | F16L 37/148 285/305 |
| 5,826,788 A * | 10/1998 | Redding | F16K 31/60 137/359 |
| 9,482,255 B2 * | 11/2016 | Changsrivong | F16B 21/186 |
| 9,829,028 B2 * | 11/2017 | Changsrivong | F16B 21/186 |
| 9,989,075 B2 * | 6/2018 | Bueter | F15B 15/1438 |
| 11,982,302 B1 * | 5/2024 | Deneszczuk | F16B 21/183 |
| 2020/0393046 A1 | 12/2020 | Szparagowski | |

FOREIGN PATENT DOCUMENTS

| | | | | |
|---|---|---|---|---|
| DE | 102008035186 A1 | | 2/2010 | |
| DE | 202017006867 U1 | * | 10/2018 | .............. F16B 21/18 |
| GB | 2172085 A | | 9/1986 | |
| JP | 2007139179 A | | 6/2007 | |
| JP | 2019193273 A1 | | 10/2019 | |

* cited by examiner

SECTION A-A

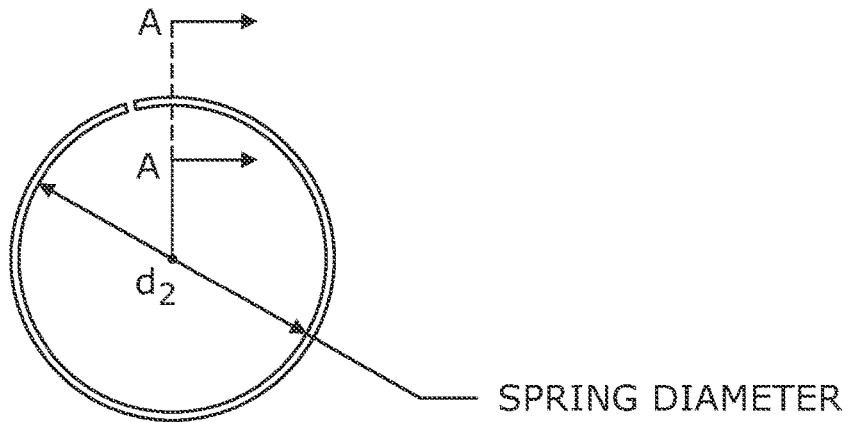
Fig. 6a
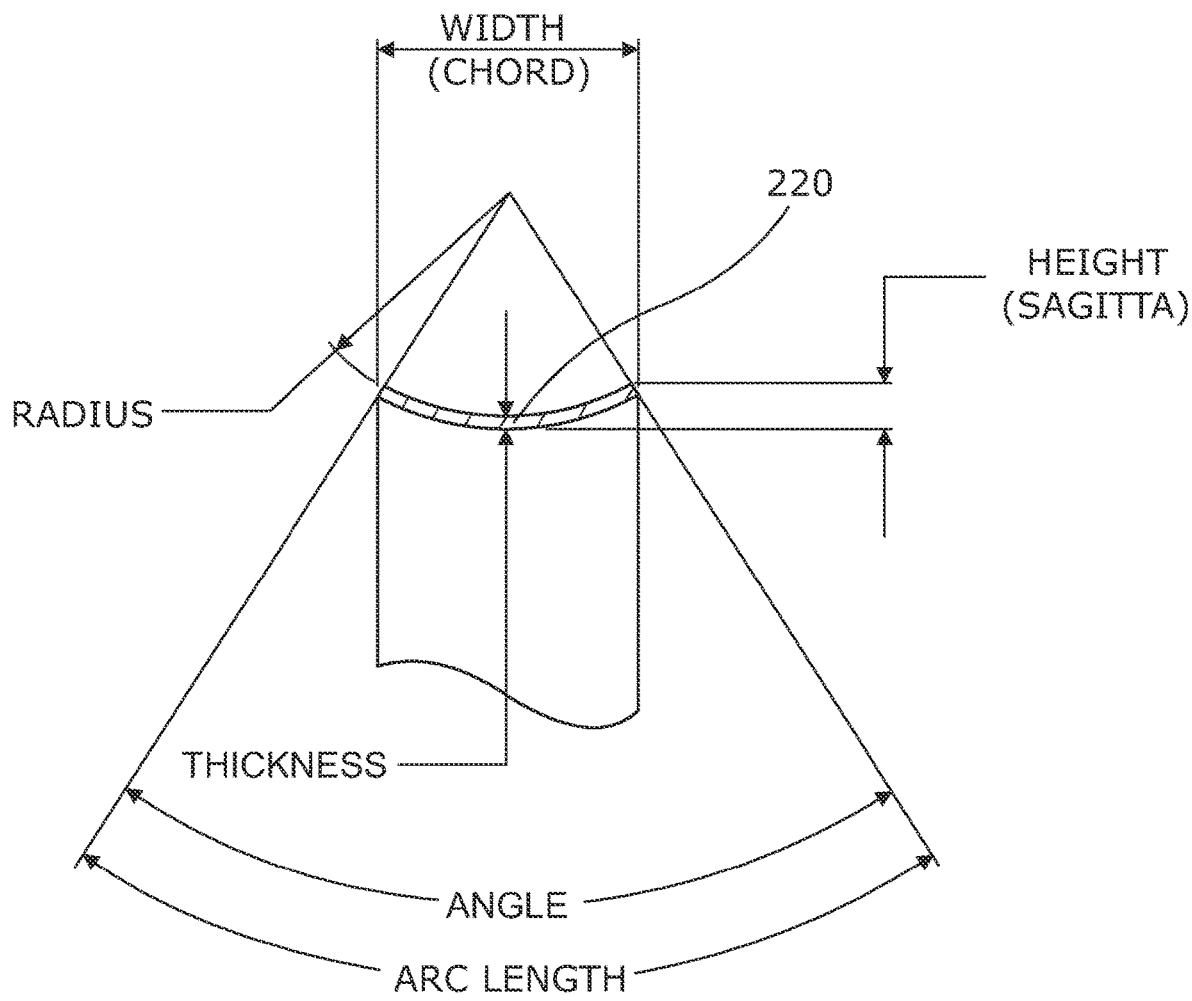
SECTION A-A     Fig. 6b

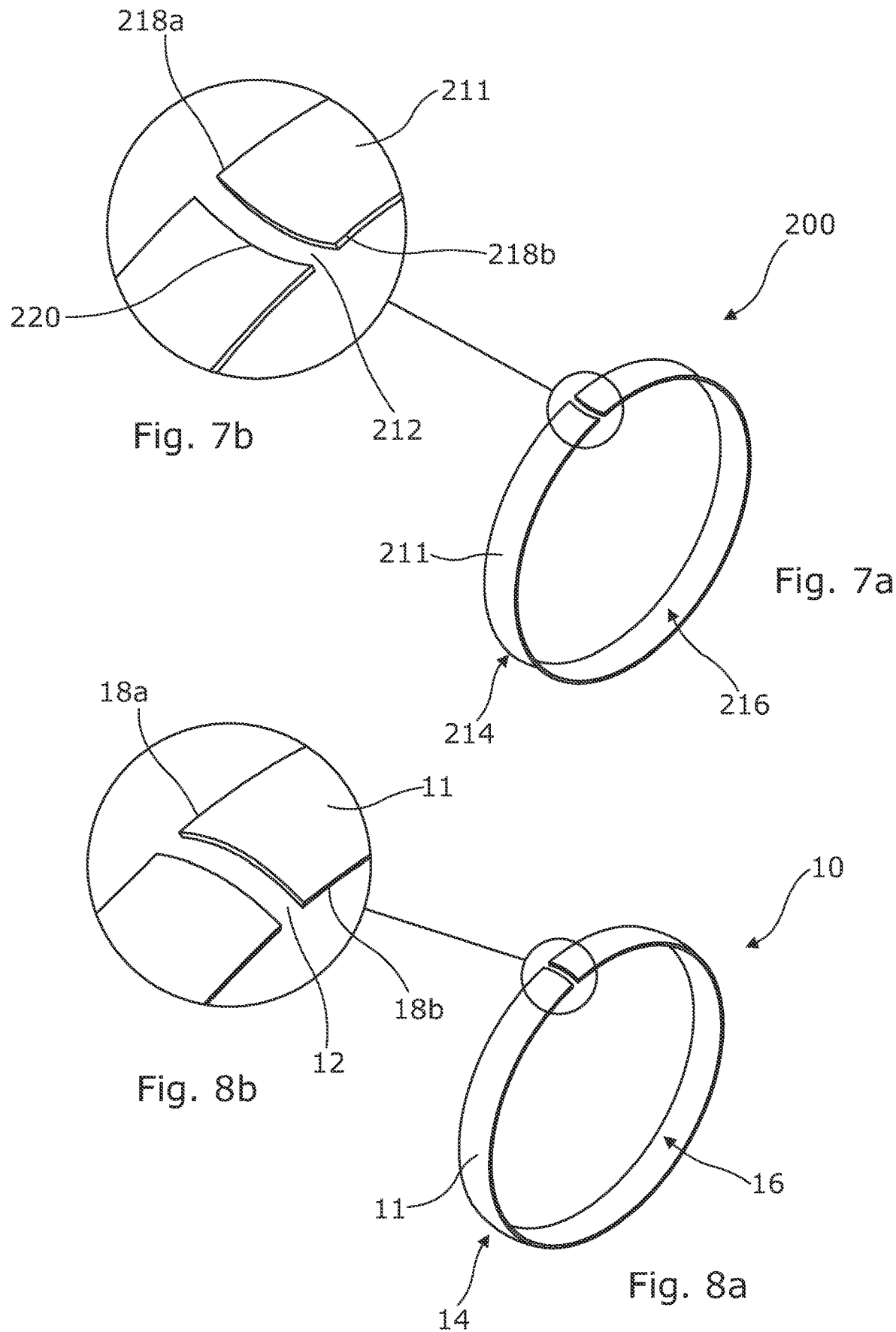

SHAFT MOUNTING ASSEMBLY

FIELD OF INVENTION

This invention relates to a shaft mounting assembly comprising a spring, and methods of assembling the same.

BACKGROUND TO THE INVENTION

Rotating machinery, for example gas turbines, can produce vibrations in use which may not be desirable, and which can lead to wear and subsequent damage to internal machine components.

Known solutions to the problem of unwanted vibrations include oil squeeze films, which can provide damping and reduce vibrations. A squeeze film may, for example, be a layer of oil between a bearing and a housing which increases the damping effect. This solution requires the presence of a radial clearance to accommodate the oil film. However, such a radial clearance provides a space which can lead to component misalignment problems.

Sealing rings have also been used to provide centralising, damping and sealing effects. However, the sealing rings can be subjected to high loads causing the sealing rings to wear out relatively quickly. Furthermore, when the gap between the shaft and the housing is filled with hot fluid, such as oil, the chemical structure of the material forming the sealing rings (e.g. rubber) can break down and cause the ring to deform. Over time, the sealing rings become less effective at sealing and providing the necessary damping/centralisation effects.

It is therefore an object of embodiments of the present invention to address at least one of the above disadvantages.

SUMMARY OF THE INVENTION

Accordingly, in a first aspect, the present invention provides a shaft mounting assembly comprising: an elongate shaft comprising an outer surface having a substantially circular cross-section;

a cylinder having an inner surface defining a bore, the bore housing the shaft, wherein the inner diameter of the cylinder is larger than the outer diameter of the shaft such that a gap is defined between the outer surface of the shaft and the inner surface of the cylinder; and, a spring comprising a substantially circular discontinuous band having correspondingly shaped axially arcuate inner and outer surfaces;

wherein one of the outer surface of the shaft and the inner surface of the cylinder comprises a groove; and wherein the groove extends around the circumference of the outer surface of the shaft or the circumference of the inner surface of the cylinder respectively;

wherein the spring is positioned in the groove such that both axial edges of the band are located within the groove; and, wherein the spring has a de-energised state in which the height of the band is greater than the depth of the groove, so that a portion of the band between the axial edges protrudes out of the groove, and the axial width of the band is less than the width of the groove; and an energised state in which the spring is compressed within the bore such that the height of the band is reduced, and the axial width of the band is increased compared to the de-energised state.

Accordingly, in a second aspect, the present invention provides a shaft mounting assembly comprising:

an elongate shaft having a substantially circular cross-section and a groove extending around the circumference of the shaft;

a cylinder having a bore housing the shaft and a side wall port communicating with the bore, wherein the inner diameter of the bore is larger than the outer diameter of the shaft such that a gap is defined between the outer surface of the shaft and the inner surface of the bore; and, a spring comprising a substantially circular discontinuous band having correspondingly shaped axially arcuate inner and outer surfaces;

wherein the spring is positioned in the groove such that both axial edges of the band are located within the groove; and, wherein the spring has a de-energised state in which the outer diameter of the band is greater than the inner diameter of the bore and the axial width of the band is less than the width of the groove; and an energised state in which the spring is compressed within the bore such that the outer diameter of the band is reduced and the axial width of the band is increased compared to the de-energised state.

Accordingly, in a third aspect, the present invention provides a shaft mounting assembly comprising:

an elongate shaft having a substantially circular cross-section; a cylinder having a bore housing the shaft and a side wall port communicating with the bore, wherein the inner diameter of the bore is larger than the outer diameter of the shaft such that a gap is defined between the outer surface of the shaft and the inner surface of the bore; and, wherein the bore comprises a groove extending around the circumference of the bore;

a spring comprising a substantially circular discontinuous band having correspondingly shaped axially arcuate inner and outer surfaces;

wherein the spring is positioned in the groove such that both axial edges of the band are located within the groove; and, wherein the spring has a de-energised state in which the inner diameter of the band is less than the outer diameter of the shaft and the axial width of the band is less than the width of the groove; and an energised state in which the spring is compressed within the bore such that the inner diameter of the band is increased and the axial width of the band is increased compared to the de-energised state.

The spring can be a stiff, high-rate spring to provide radial anti-vibration action, and also to provide a centralising effect between the shaft and the cylinder. The spring of the present invention can provide radial centralising of the shaft within the cylinder, thus allowing any sealing rings to act only as seals. This can help to increase the longevity of the sealing rings.

Furthermore, the axially arcuate, or crescent, shape of the inner and outer surfaces of the band, combined with the material the band is made of, means that the spring is both axially and radially resilient and compliant (flexible). In turn, this can allow the spring to withstand higher axial and radial loads in use compared to sealing rings alone.

The outer surface of the shaft may comprise the groove, such that the groove extends around the circumference of the outer surface of the shaft. Alternatively, the inner surface of the cylinder may comprise the groove, such that the groove extends around the circumference of the inner surface of the cylinder.

The groove can comprise a recessed base, and two substantially parallel side faces arranged perpendicular to the base. The groove can comprise an opening, such as opposite the recessed base, such that the spring can protrude from the groove through the opening. The opening can be flush with the inner surface of the cylinder, or the outer surface of the shaft.

In the energised state, the spring can be compressed within the bore between the outer surface of the shaft and the inner surface of the cylinder. The portion of the band between the axial edges can protrude out of the groove in the de-energised and the energised states. In the energised state, the portion of the band can extend across the gap to make a single point of contact with the inner surface of the cylinder or the outer surface of the shaft, depending on whether the groove is located around the outer surface of the shaft or the inner surface of the cylinder respectively. The single point of contact can be located at the mid-point between the two axial edges of the band.

The maximum, or outer, diameter of the outer surface of the band may be greater than the inner diameter of the cylinder, when the groove extends around the outer surface of the shaft. Alternatively, the minimum, or inner, diameter of the inner surface of the band may be less than the outer diameter of the shaft, when the groove extends around the inner surface of the cylinder.

In the de-energised state, the axially arcuate surfaces of the band can have an arc measure (the arc angle) of from 60 degrees to 80 degrees relative to the radius of the arc. The arc angle may be around 70 degrees relative to the radius of the arc.

The band can have correspondingly shaped arcuate inner and outer surfaces along the longitudinal axis of the band. The outer surface of the band may be axially convex in shape and the inner surface of the band may be correspondingly axially concave in shape. Alternatively, the outer surface of the band may be axially concave in shape and the inner surface of the band may be correspondingly axially convex in shape.

The portion of the band which protrudes out of the groove may be the peak, or apex, of the outer surface of the band, when the groove is located around the outer surface of the shaft. The apex can be located at the mid-point between the two axial edges of the band. Alternatively, the portion of the band which protrudes out of the groove may be the trough of the inner surface of the band, when the groove is located around the inner surface of the cylinder. The trough can be located at the mid-point between the two axial edges of the band.

The inner and outer surfaces may have a circular arc shape. As the spring is energised by radial compression (due to compression between the outer surface of the shaft and the inner surface of the cylinder), the width of the band increases as the axial edges of the band move away from each other in an axial direction.

In the de-energised state, the narrower width of the band compared to the width of the groove means that there is sufficient space to allow the band to axially spread (i.e. the axial width of the band increases) as the spring is energised. As explained further below, in addition to a centralising effect, this can help to provide a radial restorative effect.

The band can have a substantially regular or uniform profile. In both the de-energised and energised states, the band can have a substantially constant thickness.

The thickness of the band may be at least 0.12 mm. The ratio of the width of the band (chord of the axially arcuate surfaces) to the thickness of the band may be approximately 30:1 in the de-energised state.

The aspect ratio of the axial width of the band (the chord of the axially arcuate surfaces) to the height of the arcuate surfaces (the sagitta) can be 6:1 in the de-energised state. The sagitta in the de-energised state is greater than the sagitta in the energised state (when the spring is compressed within the bore).

The aspect ratio of the width of the groove to the depth of the groove can be 10:1. In both the energised and de-energised states, the height of the band can be greater than the depth of the groove, such that at least a portion of the band can protrude out of the opening of the groove.

The width of the band can be less than the width of the groove in the energised state.

The discontinuous band can comprise a gap in its circumference, such that the ends of the band are spaced apart. As the spring is compressed within the bore, the ends of the band can be brought closer together to allow the band to contract around the shaft, or the ends of the band are spaced further apart to allow the band to expand within the bore. The gap can become smaller when compared to the de-energised state as the band contracts around the shaft. The gap can become bigger when compared to the de-energised state as the band expands within the bore. In use, when the spring is in the energised state, the gap can allow the spring to expand or contract due to thermal fluctuations within the assembly.

In some embodiments, the discontinuous band may be comprised of spring steel. However, it will be appreciated that any other suitable material can be used. The material preferably has a stiff, high spring rate. For example, the spring rate can be in the range of 1800 N/mm to 2100 N/mm.

The assembly can additionally comprise a further spring comprising a substantially circular and discontinuous band having correspondingly shaped axially arcuate inner and outer surfaces. The further spring can be positioned in the groove such that both axial edges of the band of the further spring are located within the groove. The spring and the further spring can be double banked, such that they are stacked on top of the other within the groove. The depth of the groove may be increased by one spring thickness to accommodate the stacked spring arrangement. The combined spring rate of the stacked springs can be in the range of 5500 N/mm to 6500 N/mm, for example 6000 N/mm.

The further spring can also comprise a gap in its circumference. The gap of the spring and the gap of the further spring can be aligned. Alternatively, the gap of the spring and the gap of the further spring can be circumferentially offset.

Using a single spring arrangement, a greater spring rate can typically be achieved by increasing in the spring thickness. However, a thicker spring will have a reduced range of radial movement because the stress in the spring can become too high. Using a stacked spring arrangement instead, the spring rate can be increased without having to make the individual springs thicker. This means that the range of radial travel is very similar to a single spring arrangement. Therefore, a stacked spring arrangement can provide a greater spring rate compared to a single spring arrangement, whilst maintaining the same range of radial travel as the single spring arrangement.

The shaft can have a further groove extending around the circumference of the outer surface of the shaft. Alternatively, the inner surface of the cylinder can have a further groove extending around the circumference of the inner surface of the cylinder. A sealing ring can be positioned within the further groove.

The cylinder can have a side wall port communicating with the bore. The groove can be located between the further groove and the side wall port. The outer surface of the shaft can comprise a groove and a further groove on both sides of the side wall port. Alternatively, the inner surface of the cylinder can comprise a groove and a further groove on both sides of the side wall port. Each groove can be located between the respective further groove and the side wall port. Each groove can contain a spring, as described herein. Each groove can also contain a further spring, as described herein. Each further groove can contain a sealing ring.

The side wall port can provide a supply of a bearing fluid to the gap. The assembly can be a static piston assembly. A static piston assembly can be defined as non-rotational and non-reciprocating.

Accordingly, in a fourth aspect, the present invention provides a method of assembling the assembly according to the first aspect of the invention, the method comprising the steps of:
  installing the spring within the groove, by either:
  spacing apart the ends of the band, positioning the band around the shaft, and releasing the ends so that the band seats in the groove located around the outer surface of the shaft; or,
  bringing together the ends of the band, positioning the band within the bore, and releasing the ends so that the band seats in the groove located around the inner surface of the cylinder; and,
  inserting the shaft into the bore and compressing and energising the spring such that the ends of the band are moved relative to each other.

In embodiments where the band is positioned around the shaft, the step of inserting the shaft into the bore and compressing and energising the spring causes the ends of the band to be brought closer together. In embodiments where the band is positioned within the bore, the step of inserting the shaft into the bore and compressing and energising the spring causes the ends of the band to be moved further apart.

Due to the shape of the spring, the net radial force acting on the shaft will be zero, which helps to keep the shaft concentric with the bore, and also provide a radial restorative effect. If the shaft is moved off-centre in a given direction, the spring will act to re-centre the shaft within the bore, by increasing the reaction force in the given direction whilst reducing the force in the opposite direction. As such, the load on the spring may not be even around the circumference of the spring, but the net force will remain zero. When the groove is located around the outer surface of the shaft, the action of the spring may be referred to as outspringing. When the groove is located around the inner surface of the cylinder, the action of the spring may be referred to as inspringing.

The method may further comprise installing the further spring within the groove, by either:
  spacing apart the ends of the band, positioning the band around the shaft, and releasing the ends so that the band seats in the groove, and the further spring is stacked on top of the spring; or bringing together the ends of the band, positioning the band within the bore, and releasing the ends so that the band seats in the groove, and the further spring is stacked on top of the spring.

In embodiments comprising a spring and a further spring stacked on top of the other within the groove, this may minimise the force that is required to re-centre the shaft within the cylinder, and provide a stronger restorative effect.

Whilst the invention has been described above, it extends to any inventive combination set out above, or in the following description or drawings.

BRIEF DESCRIPTION OF THE DRAWINGS

The invention may be performed in various ways, and an embodiment thereof will now be described by way of example only, reference being made to the accompanying drawings, in which:
FIGS. 6a and 6b show a side view and a sectional view of a further embodiment of the spring, and the terminology used to describe various aspects of its geometry;
FIGS. 7a and 7b show a perspective and an enlarged view of the FIGS. 6a and b spring;
FIGS. 8a and 8b show a perspective and an enlarged view of the FIGS. 1a and b spring.

DETAILED DESCRIPTION OF EMBODIMENTS

The term "axial" as used herein is defined as in a direction parallel to the longitudinal axis of the spring, which extends through the centre of the band. For example, "axial width of the spring" is defined as the width of the spring extending along the longitudinal axis of the spring.

The term "radial" as used herein is defined as in a direction perpendicular to the longitudinal axis of the spring, and extends from the longitudinal axis to a point on the circumference of the band.

Figure 1A:
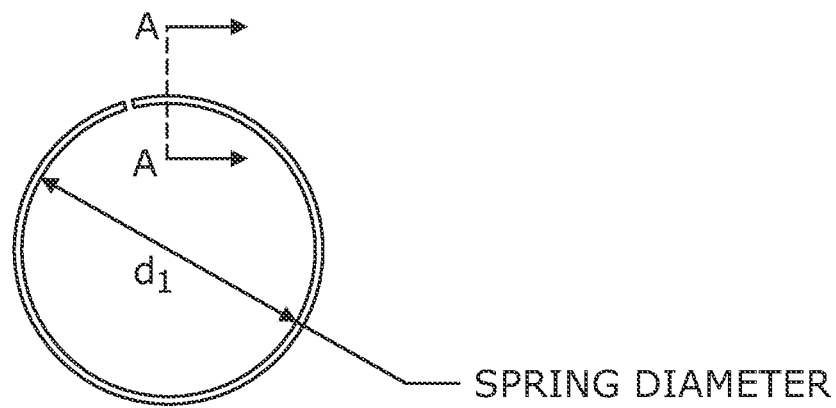
FIGS. 1a and 1b show a side view and a sectional view of the spring, and the terminology used to describe various aspects of its geometry.
Figure 1B:
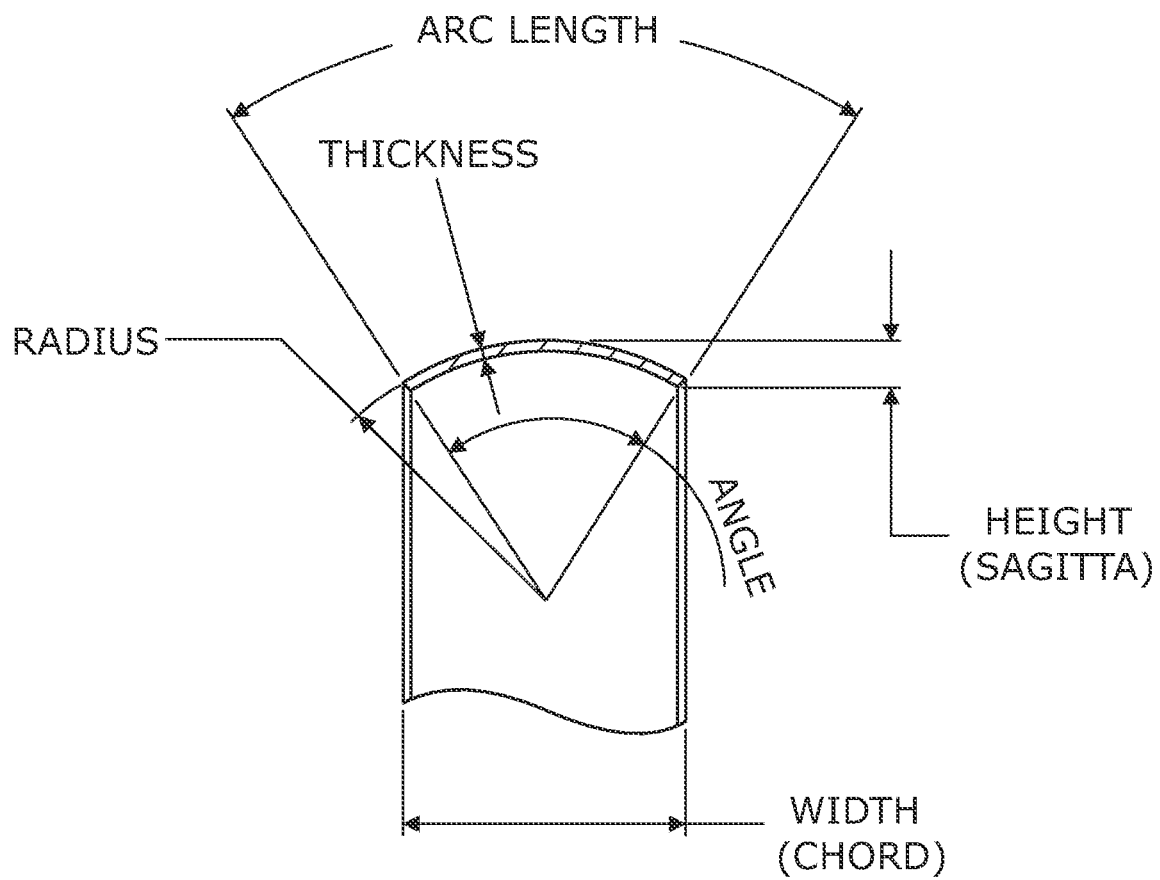

FIGS. 1a and 1b show a side view of a spring and a cross section through line A-A. The figures are labelled with various terminology used to describe the geometry of the spring herein.

Figure 2:
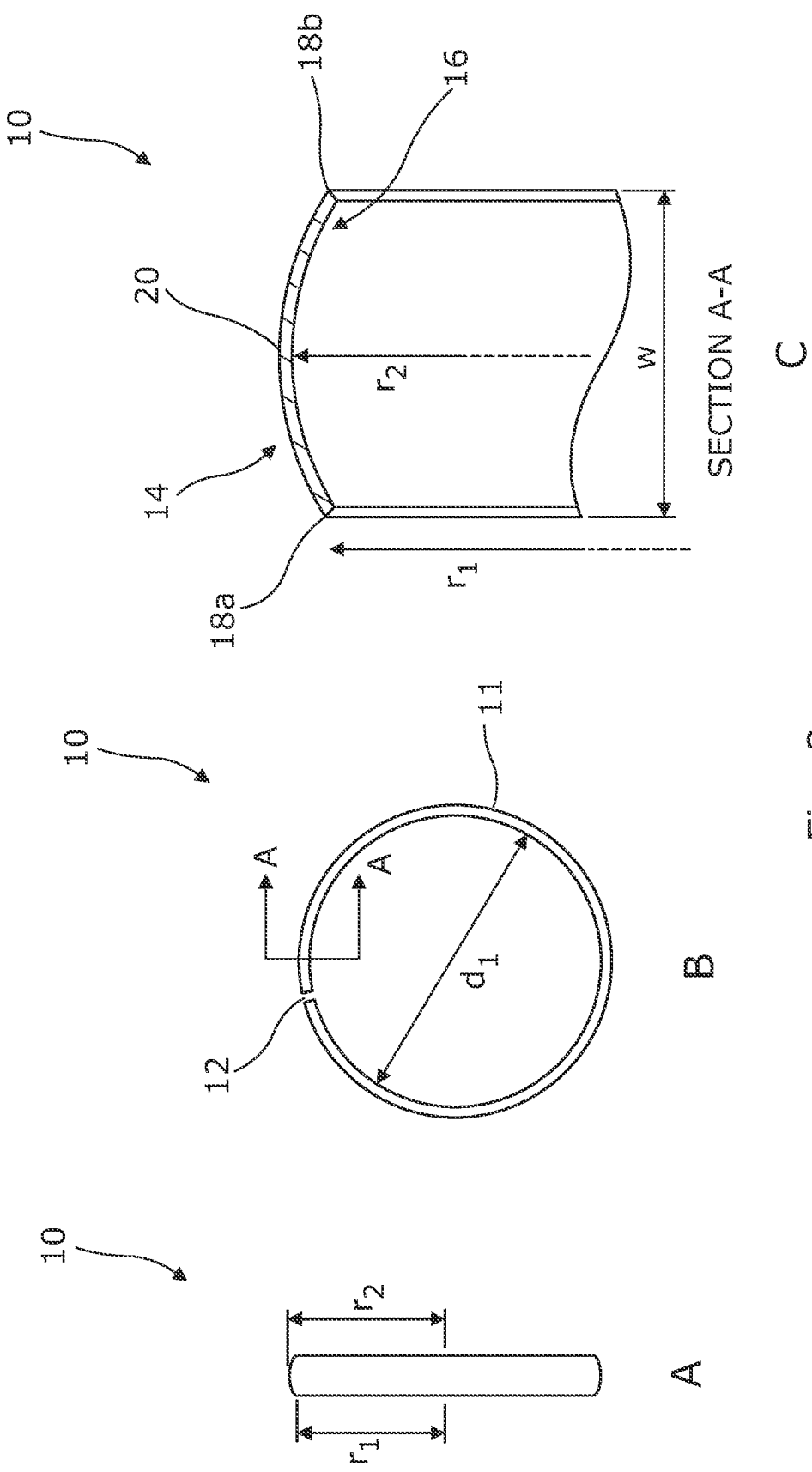
FIG. 2 shows a front view (A), side view (B), and cross-sectional view (C) of the spring.

FIG. 2 shows a de-energised spring 10 comprising a discontinuous band 11 having a substantially circular cross-section with diameter $d_1$ (seen in FIGS. 1a and 2(B)). In this example, the diameter $d_1$ may be around 28 mm. As also shown in FIGS. 8a and 8b, the discontinuity is formed by creating a gap 12 in the band, such as by axially cutting the band. The gap 12 causes the ends of the band to be spaced apart. This allows the spring to be easily fitted around a shaft, such as a piston, by separating the two ends of the band, and releasing them around the shaft (see FIG. 3). In this example, the band 11 is made of spring steel which is stiff, with a high spring-rate, and ensures that the band is sufficiently resilient to not be permanently deformed by such manipulation. It will be appreciated that other suitable materials can also be used.

The band 11 comprises an outer surface 14 and an inner surface 16, as seen in FIG. 2(C). The outer and inner surfaces 14, 16 of the band are correspondingly arcuately shaped. The outer surface 14 has an axially convex shape, and the inner surface has a corresponding axially concave shape (see FIGS. 1b and 2(C)). In this example, the arc length is around 4 mm. The width (or chord) of the axially arcuate surfaces, w, can be seen in FIG. 2(C). The width in this example is around 3.8 mm. The height, or sagitta, of the arc is demonstrated in FIG. 1b, and is around 0.66 mm when in a de-energised state. When in use, in an energised state, the height of the arcuate shape is around 0.5 mm. Thus, the axially arcuate shape of the band has an aspect ratio (the ratio of the chord to the sagitta) of around 6:1.

As can be seen in FIG. 2(B), the band 11 also comprises a regular or uniform profile and a constant thickness. In this example, the thickness of the band 11 is around 0.127 mm.

As shown in FIGS. 2(A) and (C), the outer surface 14 at boundaries 18a, 18b has a first radial distance $r_1$, that is the radial distance from the axis of the band to the boundaries of the band. The outer surface 14 at apex 20 has a second radial distance $r_2$, that is the radial distance from the axis of the band to the apex of the band.

The second radial distance $r_2$ is greater than the first radial distance $r_1$. This defines the arcuate shape, with the apex 20 positioned at the mid-point between the boundaries 18a, 18b of the band. The difference between $r_2$ and $r_1$ defines the sagitta. The arcuate shape may also be referred to as a crescent shape. The outer surface 14 and the inner surface 16 have corresponding arcuate shapes. The (outer) diameter $d_1$ is defined by the apex 20 of the outer surface 14.

Figure 5:
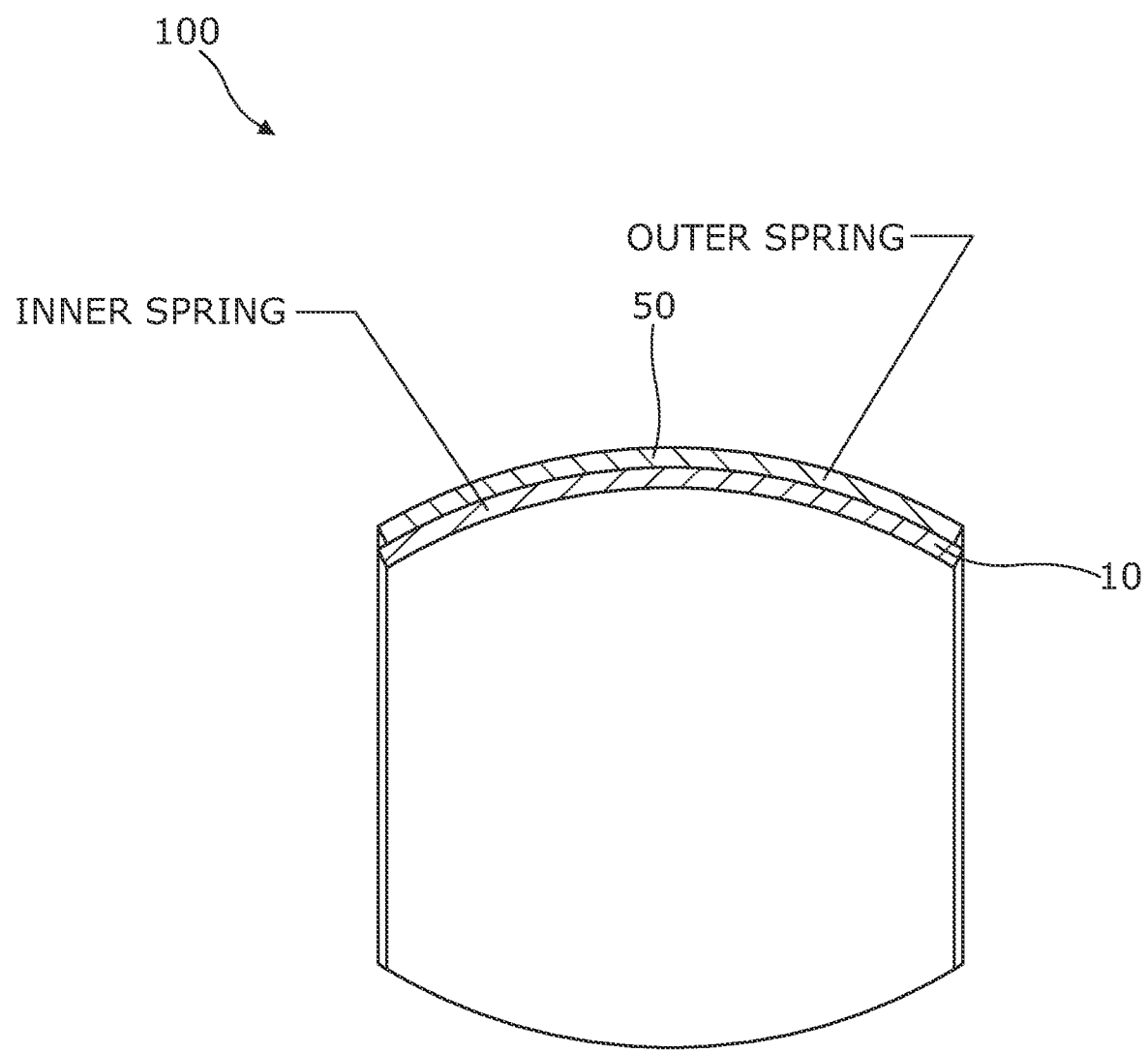
FIG. 5 shows a cross-sectional view of a stacked spring arrangement.

In embodiments, a stacked spring arrangement 100 may be provided (see FIG. 5). The stacked spring arrangement 100 comprises spring 10 and a further spring 50. Spring 50 is identical to spring 10, both structurally and functionally. As shown in FIG. 5, spring 10 and further spring 50 are stacked on top of each other. Spring 10 may be referred to as the inner spring, and further spring 50 may be referred to as the outer spring. Alternatively, the springs may be switched, such that spring 10 is the outer spring, and further spring 50 is the inner spring.

Figure 3:
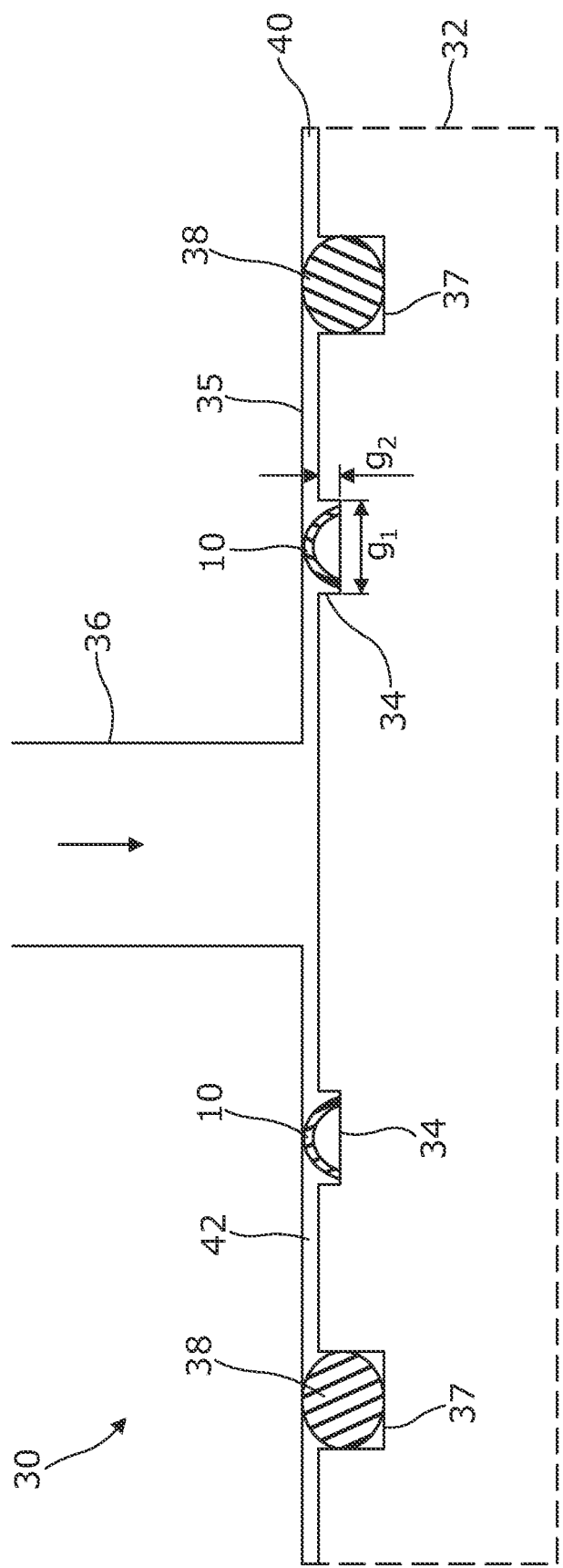
FIG. 3 shows a longitudinal cross-section through one half of a cylinder having a bore housing a shaft, and comprising the spring.

One use for spring 10, or stacked arrangement 100, is within a shaft mounting assembly 30, part of which can be seen in FIG. 3. Specifically, FIG. 3 shows a cross-section through one half of an elongate shaft 32 located within the bore of a cylinder or housing 35. The shaft mounting assembly 30 can be non-reciprocating and non-rotational. That is, the shaft 32 and cylinder 35 are not intended to move relative to each other. The shaft mounting assembly 30 may be a static piston assembly.

The cylinder 35 comprises a side wall port 36. The inner diameter of the cylinder 35 is larger than the outer diameter of the shaft 32, thus creating a gap 40 between the outer surface of the shaft 32 and the inner surface of the cylinder 35. The gap 40 is filled with a fluid 42, such as oil. In use, the layer of fluid 42 between the cylinder 35 and the shaft 32 is supplied via the port 36, and provides an anti-vibration damping effect, which in turn can help to minimise the vibrations and noise transmitted through the assembly when in use.

The shaft 32 has a substantially circular cross-section, and comprises two longitudinally spaced apart grooves 34, and two further longitudinally spaced apart grooves 37, around the circumference of the outer surface of the shaft 32. The grooves 34 each contain a spring 10, as described above. The spring 10 is entirely located within groove 34, such that both axial edges of the spring 10 (boundaries 18a, 18b) are located within the groove 34. Alternatively, the grooves 34 can comprise a stacked spring arrangement 100, comprising the spring 10 and a further spring 50. Both the spring 10 and the further spring 50 are entirely located within groove 34, such that both axial edges of the spring 10 and the further spring 50 are located within the groove 34.

The grooves 34 comprise a recessed base, two substantially parallel side faces arranged perpendicular to the base, and an opening located opposite the recessed base through which the spring 10 can protrude from the groove 34. The opening is flush with the outer surface of the shaft 32.

The grooves 37 each contain a seal in the form of an O-ring 38. As can be seen in FIG. 3, the springs 10 (and grooves 34) are located between the O-rings 38 (and grooves 37) and the port 36.

Conventionally, the O-rings alone would provide the damping and centralising effects, as well as providing the required sealing effect. The springs of the present invention carry the radial load so that the O-rings can act predominantly as seals, whilst the springs act as centralisers. This can help to prolong the lifespan of the O-rings.

The width (or chord), w, of the band 11 is less than the width $g_1$ of groove 34. Whilst in the de-energised state, the height of the arc is greater than the depth of the groove, such that the apex 20 of the band protrudes out of the opening of groove 34. There is also a gap between one or both side edges of the groove 34, and one or both axial edges (boundaries 18a, 18b) of the band. The gap allows the band to axially expand when compressed and energised in use. In embodiments, the width of the groove may be 3 mm, and the width of the band (namely, the chord of the axially arcuate surfaces) may be less than 3 mm (in both the energised and de-energised states). When energised, the width of the band 11 remains less than the width of the groove 34.

In the de-energised state, diameter $d_1$ defined by the apex 20 of the outer surface 14 is greater than the inner diameter of the cylinder. When energised, the sagitta/height of the arc remains greater than the height of the groove, such that the apex 20 of the band protrudes out of the opening of groove 34 and into and across the gap 40. The outer surface 14 of the band then makes a single point of contact with the inner surface of the cylinder 35 (defining the bore), which helps the springs 10 to provide the required centralising effects. Furthermore, the springs 10 can provide an element of sealing, although in this embodiment, this is not their primary purpose.

The above description also applies to stacked arrangement 100. The width of the band of further spring 50 may also be less than 3 mm (in both the energised and de-energised states). In embodiments utilising the stacked spring arrangement 100, the apex of the band of the outer spring (further spring 50 in FIG. 5) protrudes out of the opening of groove 34 and into the gap 40. The outer surface of the band then contacts the inner surface of the cylinder 35, which helps the stacked spring arrangement 100 to provide the required centralising effect. Furthermore, the depth of the groove 34 is increased by around one spring thickness compared to the groove depth for spring 10 alone in order to accommodate the further spring 50.

Figure 4:
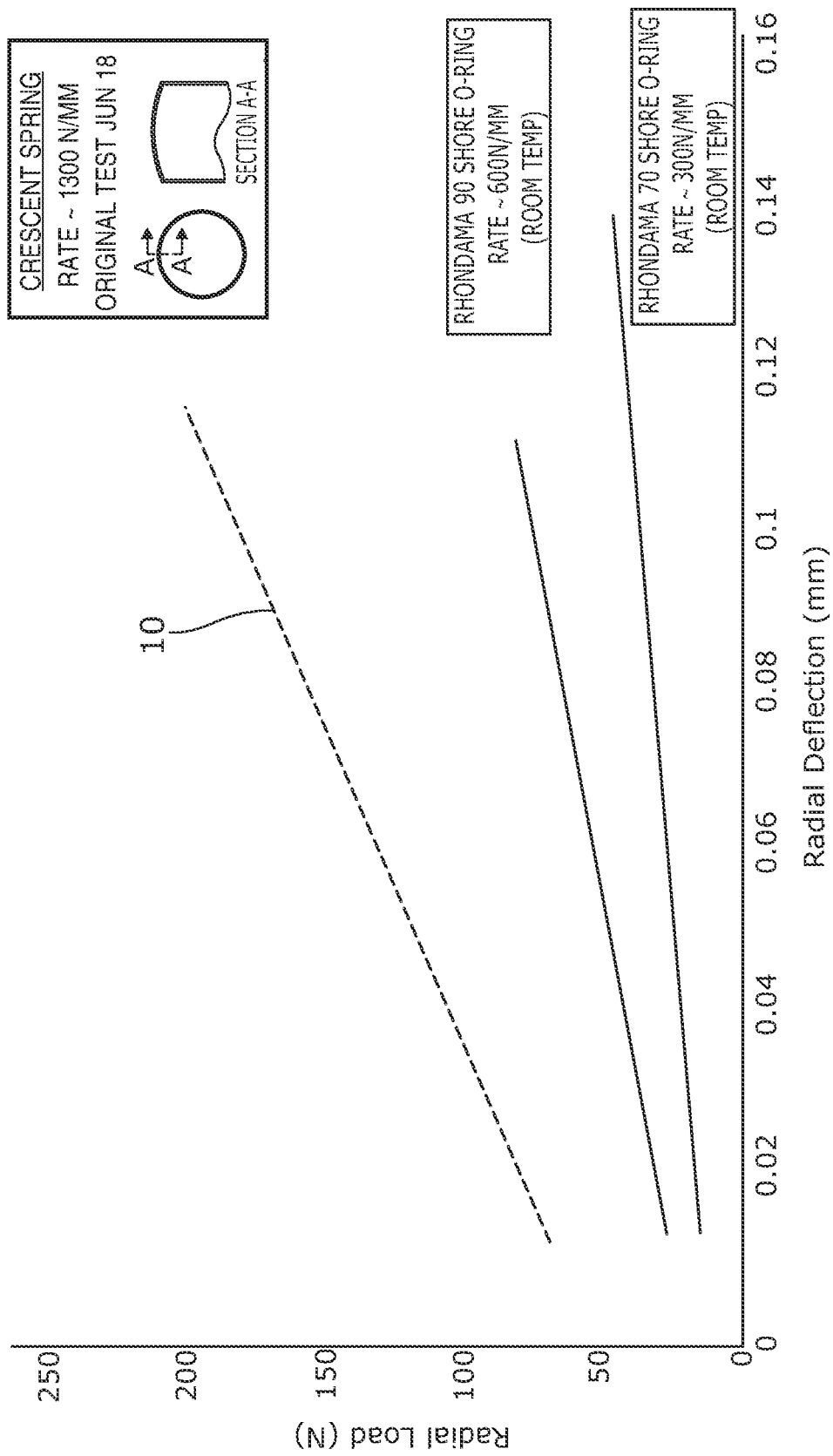
FIG. 4 plots the radial deflection against the radial load of the spring of FIG. 2 and different sealing rings.

FIG. 4 shows some test results obtained by the Applicant which show the relationship between the radial deflection of the spring 10 and O-rings 37 and the radial load applied. Both O-rings tested were manufactured by Rhondama, and comprise different spring rates (300 $Nmm^{-1}$ and 600 $Nmm^{-1}$). The spring 10 was manufactured by the Applicant. The graph clearly shows that springs 10 are able to withstand higher radial loads compared to O-rings alone. Therefore, the springs 10 are much better suited to providing the required centralising effects for the shaft compared to O-rings alone. By allowing the springs 10 to take most of the radial load, the O-rings are much more effective at providing the required sealing.

In use, the cylinder 35 and shaft 32 are assembled by firstly installing a spring 10 within each groove 34, by spacing apart the ends of the band and releasing them around the respective groove 34. At this point, a further spring 50 may also be installed within one or both of the grooves 34, by spacing apart the ends of the band and releasing them around the respective groove 34, such that spring 50 sits on top of spring 10 within the groove 34.

The following process will be described with regard to the single spring arrangement comprising spring 10 within each groove 34, but the process will also apply to the stacked spring arrangement 100 comprising spring 10 and further spring 50 within each groove 34.

At this point springs 10 are de-energised, and there is a gap between the axial edges of the band (boundaries 18a, 18b) and the edges of the respective groove 34.

The shaft 32 is then inserted into the cylinder 35 (from left to right in FIG. 3). As the first spring 10 (the rightmost spring in FIG. 3) enters the bore, it is deformed and compressed, and becomes energised. In the energised state, the ends of the band 11 are brought together around the shaft 32. As the band is compressed between the outer surface of the shaft and the inner surface of the cylinder, the height of the band is reduced, and the edges of the band (boundaries 18a, 18b) move away from each other in the axial direction and towards the edges of the groove, and the spaced apart ends of the band are brought closer together around the shaft. However, at no point does the chord distance between 18a and 18b become equal to the groove width $g_1$, that is the band arcuate shape is not controlled axially by the groove 34, and the chord distance between 18a and 18b is always less than $g_1$. The rightmost spring 10 is held in the energised position between the shaft 32 and the cylinder 35. The apex 20 of the spring 10 makes a single point of contact with the inner surface of the cylinder 34.

As the shaft 32 moves further into the bore, the rightmost spring 10 has to move past radial port 36, which provides a side opening to the cylinder 35. There may be up to four radial ports, set 90 degrees apart around the circumference of the cylinder 35. As the rightmost spring 10 moves past port 36, it can relax and at least partially de-energise. However, when the rightmost spring 10 reaches the other side of the port, it is again deformed and compressed, and becomes fully re-energised.

Conventionally shaped rings are more likely to catch on the corner where the port 36 meets the remainder of the cylinder 35, thus making assembly more difficult. The axially arcuate shape of spring 10, along with its resilience and compliance, makes assembly easier and more efficient.

As the shaft 32 moves even further into the cylinder 35, the second or leftmost spring 10 of FIG. 3 will eventually enter the bore, and will deform and compress, and become energised. The leftmost spring 10 does not move past radial port 36.

When the shaft 32 is fully inserted into the bore of the cylinder 35, a spring 10 is located on either side of radial port 36. Both springs 10 are held in the energised position between the shaft 32 and the cylinder 35.

Once the shaft 32 is fully inserted into the bore of the cylinder 35, the gap 40 is then filled with oil 42 via port 36. In use the fluid acts as a bearing.

In the energised position, the spring 10 exerts a net zero radial force against the inner surface of the cylinder 35, which in use centres the shaft 32 within the cylinder 35. The energised spring 10 also provides a radial anti-vibration effect, along with the oil 42 (which also acts as a bearing).

The net force acting on the shaft is zero, which helps to keep the shaft 32 centralised within the cylinder 35 (that is, the shaft and cylinder are concentric), and also provide a radial restorative effect. If the shaft is moved off-centre in a given direction, the spring 10 provides the required force to re-centre the shaft 32 within the cylinder 35, by increasing the reaction force in the given direction whilst reducing the force in the opposite direction. As such, the load on the spring 10 may not be even around the circumference of the spring 10, but the net force will remain zero. The spring 10 can react to approximately 1000 N/mm of force in the radial direction, with a maximum displacement of around 0.1 mm (as determined by the radial clearance provided by the gap 40).

It is therefore no longer the responsibility of the O-rings to provide a damping and centralising effect, and as such they can focus on sealing the shaft 32 in the cylinder 35. In this embodiment, the spring 10 does provide an element of sealing, which can help to further increase the longevity of the O-rings by reducing the amount of hot oil 42 reaching the O-rings.

FIGS. 6a, 6b, 8a, 8b and 9 show a further embodiment of the spring 200. The structural and functional features described above with respect to spring 10 also apply to spring 200, with any differences being highlighted below.

The spring 200 is essentially an inverted version of spring 10, that is the outer surface 214 has an axially concave shape, and the inner surface 216 has a corresponding axially convex shape. The inner surface 214 at boundaries 218a and 218b has a larger radial distance than the inner surface 214 at trough 220, which defines the arcuate shape. The trough 220 is positioned at the mid-point between boundaries 218a and 218b of the band 211.

FIGS. 6a and 6b show a side view of the spring 200 and a cross-section through line A-A. The figures are labelled with various terminology used to describe the geometry of the spring 200. FIGS. 7a and 7b show a de-energised spring 200 comprising a discontinuous band 211 having a substantially circular cross-section with (inner) diameter $d_2$ defined by the trough 220 of the inner surface 216. The discontinuity is formed by creating a gap 212 in the band, which causes the ends of the band 211 to be spaced apart. This allows the spring to be easily fitted within a bore, by compressing the two ends of the band together, inserting the band 211 into the bore of a cylinder and releasing the band 211 so it seats in a groove 234 extending around the inner surface of the cylinder (see FIG. 9).

Figure 9:
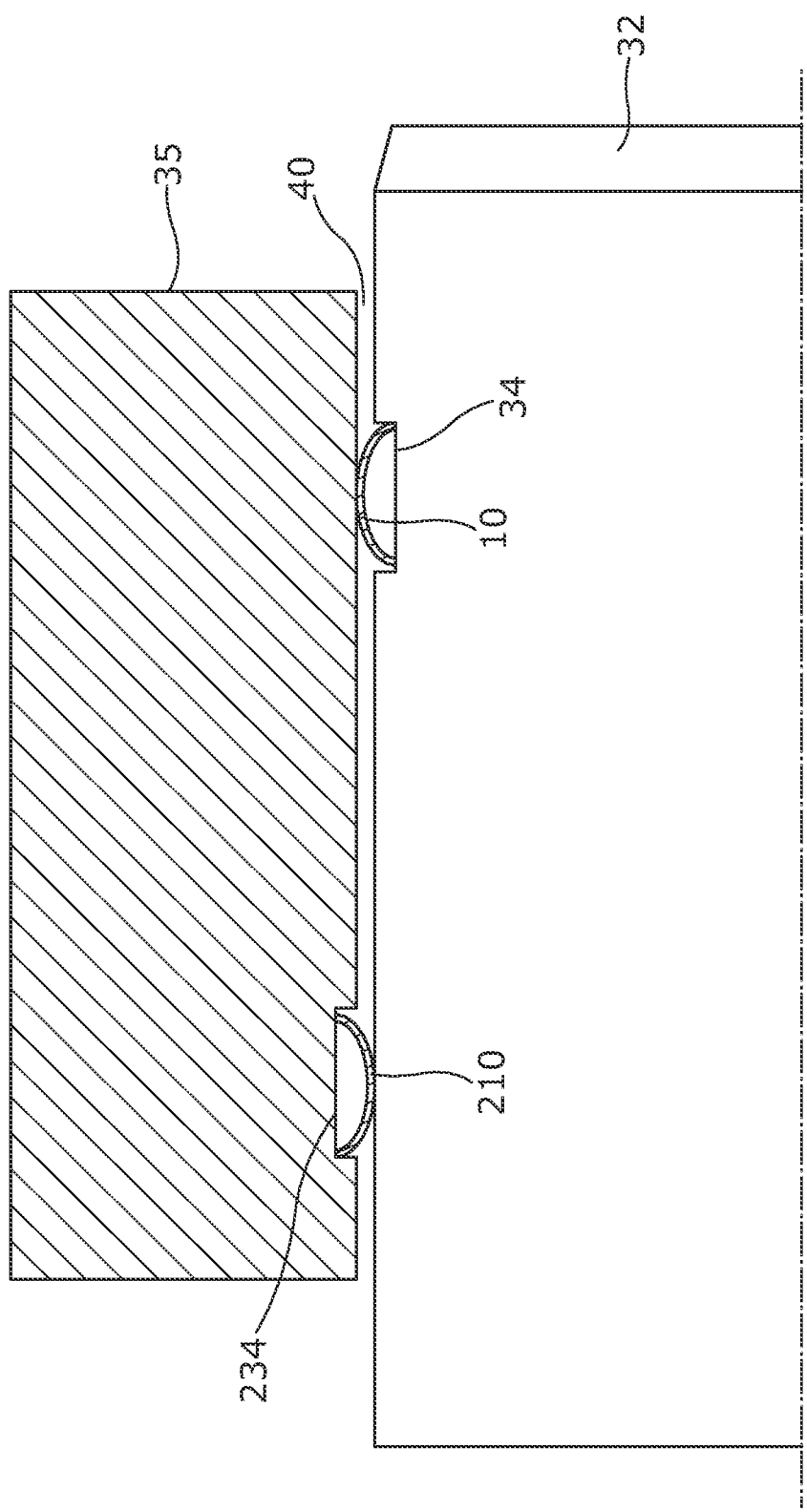
FIG. 9 shows a longitudinal cross-section through one half of a cylinder having a bore housing a shaft, and comprising the FIG. 7a spring and the FIG. 8a spring.

Spring 200 can be used in a shaft mounting assembly as shown in FIG. 9. Specifically, FIG. 9 shows a cross-section through one half of an elongate shaft 32 located within the bore of a cylinder or housing 35. The bore defined by the inner surface of the cylinder 35 has a substantially circular cross-section. The inner surface of the cylinder 35 comprises a groove 234 extending around the circumference of the inner surface of the cylinder 35. The groove 234 is the same as groove 34, except it is located around the inner surface of the cylinder 35 instead of around the outer surface of the shaft 32. The groove 234 contains a spring 200, which is entirely located within groove 234, such that both axial edges of the spring 200 (boundaries 218a, 218b) are located within the groove 234.

Similar to FIG. 3, the inner diameter of cylinder 35 is larger than the outer diameter of the shaft 32, thus creating a gap 40 between the outer surface of the shaft 32 and the inner surface of the cylinder 35. Diameter $d_2$ defined by the trough 220 of the inner surface 216 of the band 211 is less than the outer diameter of the shaft 32. In use, the shaft 32 is inserted into the cylinder 35, and as the shaft 32 passes across spring 200, the spring 200 is deformed and compressed, and becomes energised. As the band is compressed between the outer surface of the shaft 32 and the inner surface of the cylinder 35, the height of the band 211 is reduced, and the edges of the band (boundaries 218a, 218b) move away from each other in the axial direction and towards the edges of the groove, and the spaced apart ends of the band are moved further apart within the bore. The trough 220 of the spring 200 protrudes out of the opening of the groove 234 and extends across the gap 40 to make a single point of contact with the outer surface of the shaft 32.

For comparison, FIG. 9 additionally shows a groove 34 located around the shaft 32 and comprising a spring 10, as described above. Although spring 200 is an inverted version of spring 10, it functions in exactly the same way as spring 10 in both the de-energised and energised states. In embodiments, a stacked spring arrangement may be provided, as described above, which comprises spring 200 and a further spring stacked on top of each other.

Although the invention has been described above with reference to different embodiments of the invention, it will be appreciated that various changes or modifications may be made without departing from the scope of the invention as defined in the appended claims. For example, in some embodiments, the corner where the port meets the remainder of the cylinder may have an angled/tapered surface, such as a chamfered surface. Such an angled surface can assist with assembly, and help to return the spring to the energised position between the shaft and the cylinder, after passing the port.

The invention claimed is:

1. A shaft mounting assembly comprising:
   an elongate shaft comprising an outer surface having a substantially circular cross-section;
   a cylinder having an inner surface defining a bore, the bore housing the shaft, wherein the inner diameter of the cylinder is larger than the outer diameter of the shaft such that a gap is defined between the outer surface of the shaft and the inner surface of the cylinder; and,
   a spring comprising a substantially circular discontinuous band having correspondingly shaped axially arcuate inner and outer surfaces, wherein an axial width of the band is less than a width of a groove in an energised state;
   wherein one of the outer surface of the shaft and the inner surface of the cylinder comprises the groove; and wherein the groove extends around the circumference of the outer surface of the shaft or the circumference of the inner surface of the cylinder respectively;
   wherein the spring is positioned in the groove such that both axial edges of the band are located within the groove;
   wherein the spring has a de-energised state in which the height of the band is greater than the depth of the groove, so that a portion of the band between the axial edges protrudes out of the groove, and the axial width of the band is less than the width of the groove;
   wherein the spring is compressed within the bore such that the height of the band is reduced in the energised state, and the axial width of the band is increased compared to the de-energised state; and
   wherein the shaft is a static piston housed in the cylinder, being non-reciprocating and non-rotatable relative to the cylinder.

2. An assembly as claimed in claim 1, wherein the outer surface of the band is axially convex in shape, and the inner surface of the band is correspondingly axially concave in shape.

3. An assembly as claimed in claim 2, wherein the portion of the band which protrudes out of the groove is the peak, or apex, of the outer surface of the band.

4. An assembly as claimed in claim 3, wherein the apex is located at the mid-point between the two axial edges of the band.

5. An assembly as claimed in claim 2, wherein the outer diameter of the outer surface of the band is greater than the inner diameter of the cylinder.

6. An assembly as claimed in claim 1, wherein the outer surface of the band is axially concave in shape and the inner surface of the band is correspondingly axially convex in shape.

7. An assembly as claimed in claim 6, wherein the portion of the band which protrudes out of the groove is the trough of the inner surface of the band.

8. An assembly as claimed in claim 7, wherein the trough is located at the mid-point between the two axial edges of the band.

9. An assembly as claimed in claim 6, wherein the inner diameter of the inner surface of the band is less than the outer diameter of the shaft.

10. An assembly as claimed in claim 1, wherein in the de-energised state, the axially arcuate surfaces of the band have an arc measure of from 60 degrees to 80 degrees relative to the radius of the arc.

11. An assembly as claimed in claim 1, wherein the groove comprises a recessed base, two substantially parallel side faces arranged perpendicular to the base, and an opening, such that the spring can protrude from the groove through the opening.

12. An assembly as claimed in claim 1, wherein the portion of the band between the axial edges protrudes out of the groove in the de-energised and the energised states.

13. An assembly as claimed in claim 1, wherein in the energised state, the portion of the band extends across the gap to make a single point of contact with either the inner surface of the cylinder or the outer surface of the shaft.

14. An assembly as claimed in claim 13, wherein the single point of contact is located at the mid-point between the two axial edges of the band.

15. An assembly as claimed in claim 1, wherein the band has a substantially constant thickness.

16. An assembly as claimed in claim 15, wherein the ratio of the chord of the axially arcuate surfaces to the thickness of the band is 30:1 in the de-energised state.

17. An assembly as claimed in claim 1, wherein the aspect ratio of the width of the band to the height of the arc is 6:1 in the de-energised state.

18. An assembly as claimed in claim 1, wherein the aspect ratio of the width of the groove to the depth of the groove is 10:1.

19. An assembly as claimed in claim 1, wherein the discontinuous band comprises a gap in its circumference, such that the ends of the band are spaced apart; and wherein, as the spring is compressed within the bore between the outer surface of the shaft and the inner surface of the cylinder, the ends of the band are either brought closer together to allow the band to contract around the shaft, or the ends of the band are spaced further apart to allow the band to expand within the bore.

20. An assembly as claimed in claim 1, additionally comprising a further spring; the further spring comprising a substantially circular and discontinuous band having correspondingly shaped axially arcuate inner and outer surfaces, and wherein the further spring is positioned in the groove such that both axial edges of the band of the further spring are located within the groove; and wherein the spring and the further spring are stacked on top of the other within the groove.

21. An assembly as claimed in claim 1, wherein the shaft or the cylinder comprises a further groove extending around the circumference of the outer surface of the shaft or the circumference of the inner surface of the cylinder, and a sealing ring is positioned within the further groove.

22. An assembly as claimed in claim 21, wherein the cylinder comprises a side wall port in communication with the bore; and wherein the groove is located between the further groove and the side wall port.

23. A method of assembling the assembly of claim 1, the method comprising the steps of:
   installing the spring within the groove, by either:
      spacing apart the ends of the band, positioning the band around the shaft, and releasing the ends so that the band seats in the groove located around the outer surface of the shaft; or,
      bringing together the ends of the band, positioning the band within the bore, and releasing the ends so that the band seats in the groove around the inner surface of the cylinder; and,
   inserting the shaft into the bore and compressing and energising the spring such that the ends of the band are moved relative to each other.

* * * * *